Aug. 5, 1958 M. A. LEAVITT ET AL 2,846,523
SQUARE WAVE AMPLIFIER
Filed Oct. 29, 1954
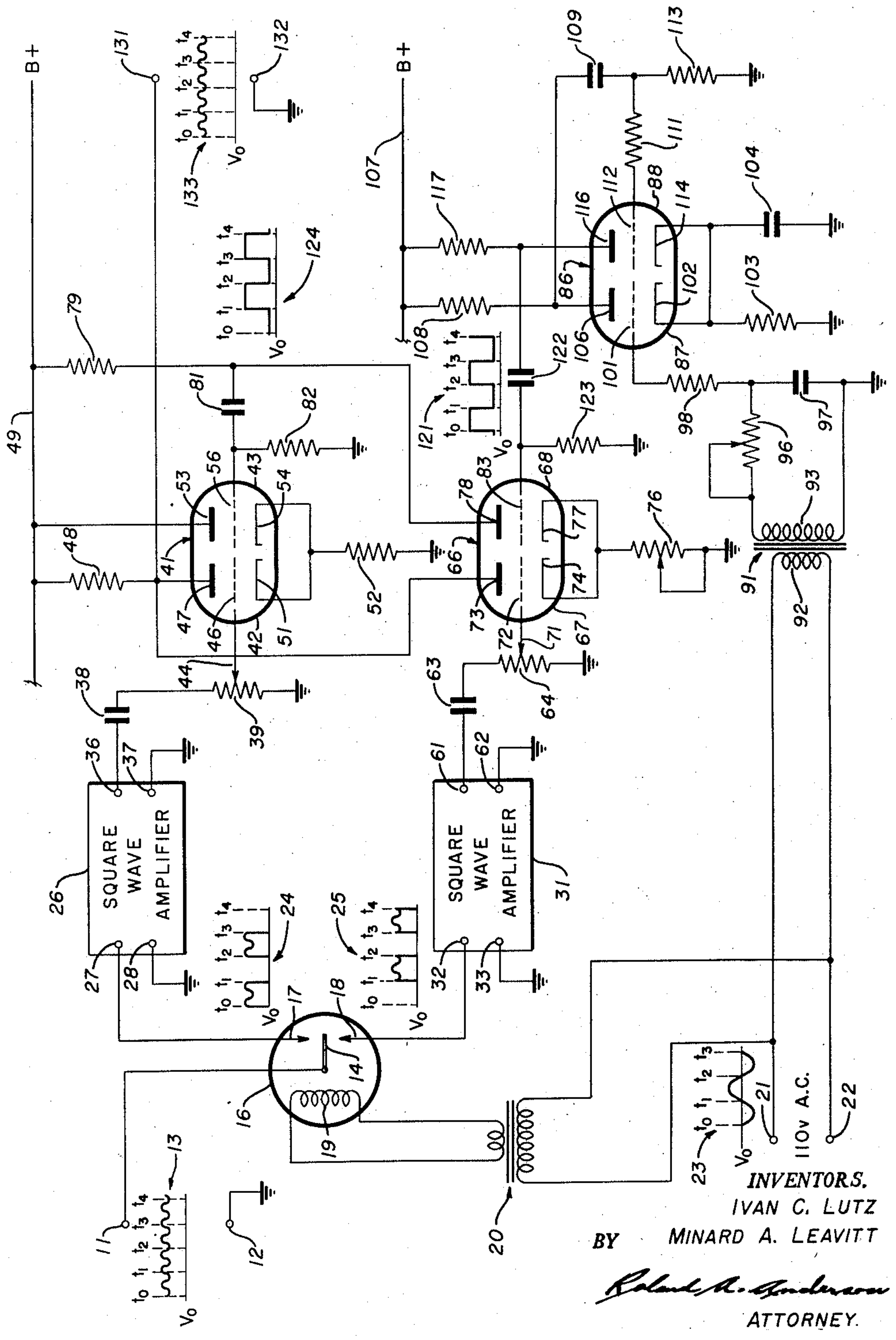
INVENTORS.
IVAN C. LUTZ
BY MINARD A. LEAVITT
Roland A. Anderson
ATTORNEY.

2,846,523

SQUARE WAVE AMPLIFIER

Minard A. Leavitt, Concord, and Ivan C. Lutz, Berkeley, Calif., assignors to the United States of America as represented by the United States Atomic Energy Commission Application October 29, 1954, Serial No. 465,759

1 Claim. (Cl. 179—171)

The present invention relates to an amplifier and, more particularly, to a circuit for amplifying signals having an alternating current component superimposed upon a direct current component.

In the past a direct current amplifier was used to amplify the direct current component of a signal and an alternating current amplifier was used to amplify the alternating current component. Then to obtain an amplified reproduction of the original signal it was necessary to feed the outputs of the two amplifiers into a mixer. The use of the two different types of amplifiers and the mixer inherently complicated the problem of obtaining a true amplified reproduction of the signal.

The present invention overcomes the foregoing difficulties and utilizes two similar amplifiers with a simple means for converting the outputs of the two amplifiers into a true amplified reproduction of the original signal. Also, in addition to such result there is no loss of any segment of the alternating current component of the signal during amplification.

It is therefore an object of the present invention to provide a new and improved amplifier circuit.

Another object of the invention is to provide an amplifier for a signal having an alternating current component superimposed upon a direct current component and utilizing a single type of amplifier circuit.

A further object of the present invention is to provide a circuit for amplifying a signal having an alternating current component superimposed upon a direct current component without loss of any segment of the alternating current component.

Still another object of the invention is to provide a method of amplifying a signal having an alternating current component superimposed upon a direct current component.

Another object is to provide a method of amplifying a direct current signal without using a direct-coupled direct current amplifier, with all of the inherent problems, using instead two conventional resistance-capacity coupled amplifiers.

Further objects and advantages of the invention will be apparent in the following description and claim considered together with the accompanying drawing which is a schematic wiring diagram.

Referring to the drawing in detail, there is provided a pair of input terminals 11 and 12 for connection to a source (not shown) of a direct current signal or a signal voltage having an alternating current component superimposed upon a direct current component, as illustrated in waveform 13 on the drawing. One of the terminals 12 is connected to ground while the other terminal 11 is directly connected to the fixed end of a vibrating element 14 of a converter unit 16. The free end of the vibrating element 14 is adapted to move alternately between two fixed electrodes 17, 18. Such converter unit 16 is provided with an actuating coil 19 which is suitably connected through a transformer 20 to terminals 21, 22 for connection to a source (not shown) of alternating current (see waveform 23). With such arrangement the voltage at the input terminals 11, 12 appears alternately at the electrodes 17, 18 for periods corresponding to a half cycle of the actuating alternating current impressed between the terminals 21, 22, as illustrated by waveforms 24, 25, respectively, on the drawing.

To amplify the signal appearing at the electrode 17, there is provided a square wave amplifier 26 of conventional design having two input terminals 27, 28. One of the terminals 28 is connected to ground and the other terminal 27 is connected to the electrode 17. Similarly, a second square wave amplifier 31, identical to amplifier 26, is connected with one input terminal 32 to the second electrode 18 and the other input terminal 33 to ground. It will be readily apparent that the square wave amplifiers 26, 31 inherently have a wide band frequency response characteristic which provides amplification of all of the frequencies making up the square wave, as well as any superimposed alternating current component, and also apparent that such amplifiers do not have to be direct-coupled amplifiers.

From the foregoing it is seen that all portions of the original signal 13 as impressed at the input terminals 11, 12 are amplified, but that it is necessary to suitably add the two amplified outputs of the amplifiers 26, 31 to attain a true amplified reproduction of the original signal. To accomplish the foregoing, it has been found that the circuitry to be described hereinafter provides the least distortion and losses during the reconversion.

The output of the first amplifier 26 is developed across two output terminals 36, 37, one (37) of which is connected to ground. A coupling capacitor 38 is connected between the terminal 36 and one end of a potentiometer 39, the other end of which is connected to ground. A dual triode type tube 41 is provided with a first section 42 serving as an amplifier stage and a second section 43 serving as part of a control switching circuit. The adjustable element 44 of the potentiometer 39 is directly connected to the control grid 46 of the first tube section 42. The anode 47 of the first tube section 42 is connected through a dropping resistor 48 to a source of positive operating potential 49 (illustrated as a B+ lead) and the cathode 51 is connected through a cathode resistor 52 to ground to complete the operating connections of the tube section.

The second tube section 43 is connected with the anode 53 directly tied to the source of positive potential 49 and the cathode 54 directly tied to the cathode 51 of the first tube section 42. Connections to the control grid 56 of such second tube section 43 will be set forth hereinafter.

Referring again to the second square wave amplifier 31, the output thereof is developed across two output terminals 61, 62, one (62) of which is connected to ground. A coupling capacitor 63 is connected between the other output terminal 61 and one end of a potentiometer 64, the other end of which is connected to ground. A second dual triode type tube 66 having a first section 67 and a second section 68 is provided for a similar purpose as stated for tube 41. The adjustable element 71 of the potentiometer 64 is directly connected to the control grid 72 of the first tube section 67. The anode 73 of the first tube section 67 is directly connected to the anode 47 of the first tube section 42 of the first tube 41 and the cathode 74 is connected through a potentiometer 76 to ground. The adjustable element of such potentiometer 76 is also connected to ground. The second section 68 of the tube 66 is connected with the cathode 77 tied directly to the cathode of the first tube section 67 and the anode 78 tied through a dropping resistor 79 to the source of positive potential 49. A coupling capacitor 81 is connected from the junction of the resistor 79 and the anode 78 of the second section 68 of the second tube 66 to the control grid 56 of the second section 43 of the first tube 41 and a resistor 82 is connected from such control grid 56 to ground. The connection of the control grid 83 of the second tube section 88 will be set forth hereinafter.

To suitably drive the control switching circuit, previously referenced as including the second sections 43, 68 of the two tubes 41, 66, respectively, a third dual triode type tube 86 having a first section 87 and a second section 88 is provided and interconnected to develop a square wave voltage. In detail, a transformer 91 has one winding (primary) 92 connected to the terminals 21, 22 and a second winding 93 connected across a phase-shifting network, comprising a potentiometer 96 connected in series with a capacitor 97. The junction between the capacitor 97 and the second winding 93 is connected to ground and the adjustable element of the potentiometer 96 is connected to the junction between the potentiometer and the winding. A current limiting resistor 98 is connected from the junction of the potentiometer 96 and capacitor 97 of the phase-shifting network to the control grid 101 of the first tube section 87 in the third tube 86. The cathode 102 of such first tube section 87 is connected to ground through a resistor 103 which is by-passed by a capacitor 104 and the anode 106 is connected to a source of positive operating potential 107 (illustrated as a second B+ lead) through a dropping resistor 108. Such first tube section 87 operates as an overdriven amplifier to produce a squaring action at the anode 106 with respect to the positive half cycle of the sine wave voltage applied to the control grid 101. The anode 106 of the first tube section 87 is coupled through a capacitor 109 connected in series with a current limiting resistor 111 to the control grid 112 of the second tube section 88. A resistor 113 is connected from the junction of the capacitor 109 and resistor 111 to ground. Such second tube section 88 is connected as a second overdriven amplifier to produce a squaring action of the remaining cycle of the sine wave voltage and to accomplish the same the cathode 114 is connected to the cathode 102 of the first tube section 87 and the anode 116 is connected through a dropping resistor 117 to the second source of operating potential 107.

The square wave voltage developed at the anode 116 of the second tube section 88 of the third tube 86 is represented by waveform 121 of the drawing and is applied to the control grid 83 of the second tube section 68 of the tube 66 by a coupling capacitor 122 directly connected from the anode 116 to the control grid 83 with the latter element connected through a resistor 123 to ground. With such connections the voltage applied to the control grid 56 of the second section of the first tube 41 has a waveform 124 as shown on the drawing.

A pair of output terminals 131, 132 are provided with one (132) connected to ground and the other (131) connected to the anode 47 of the first tube section 42 of the first tube 41. The voltage appearing between the output terminals 131, 132 has a waveform 133, as shown on the drawing, which is an amplified reproduction of the input signal 13 impressed between the input terminals 11, 12.

As an example of the values and types of elements comprising the above-described circuit the following list is set forth; however, it is not intended that such list be limiting in any manner.

| | |
|---|---|
| **38**, **63**, converter, vibrator capacitor | 0.5 mfd. |
| **39**, **64**, potentiometer | 1.0M ohms. |
| **41**, **66**, **86**, tube, type | 12AT7. |
| **48**, resistor | 15K ohms. |
| **49**, **107**, B+ | 300 volts. |
| **52**, resistor | 4.7K ohms. |
| **76**, potentiometer | 5.0K ohms. |
| **79**, resistor | 5.0K ohms. |
| **81**, capacitor | 0.5 mfd. |
| **82**, resistor | 1.0M ohms. |
| **96**, potentiometer | 50K ohms. |
| **97**, capacitor | 0.02 mfd. |
| **98**, resistor | 1.0M ohms. |
| **103**, resistor | 270 ohms. |
| **104**, capacitor | 100 mfd. |
| **108**, **117**, resistor | 47K ohms. |
| **109**, capacitor | 0.5 mfd. |
| **111**, resistor | 470K ohms. |
| **113**, resistor | 1.0M ohms. |
| **122**, capacitor | 0.5 mfd. |
| **123** resistor | 1.0M ohms. |

Consider now the operation of the circuit with a direct current signal having a superimposed alternating component (see waveform 13) impressed between the input terminals 11, 12. Under such condition the vibrating element 14 of the converter unit 16 makes contact with fixed electrode 17 for one half of the cycle of the alternating current 23 impressed upon the coil 19 and makes contact with the other fixed electrode 18 for the remaining half cycle. Thus, a square wave 24 is impressed upon the input of the first square wave amplifier 26 and a second square wave 25 is impressed upon the second square wave amplifier 31. It is to be noted that the second square wave 25 lags the first square wave 24 by 180 electrical degrees as referenced to the alternating current 23 across the coil 19 of the converter 16. As stated previously square wave amplifiers inherently have a wide band frequency response characteristic and so the outputs of the amplifiers 26, 31 contain all of the components of the inputs.

The outputs of the amplifiers 26, 31 appear across the potentiometers 39, 64, respectively, and therefore serve to drive the first sections 42, 67 of the first and second tubes 41, 66, respectively. The potentiometers 39, 64 serve as gain control elements for the first tube sections 42, 67, respectively, and therefore may be adjusted to obtain equal variations in the anode circuit, which step is necessary to obtain an exact reproduction of the input signal 13. The potentiometer 76 in the cathode circuit of the second tube 66 provides an additional bias control for the tube. It is to be noted that the dropping resistor 48 is common to both of the first tube sections 42, 67 so that, as the tubes conduct alternately in response to control grid voltages, an amplified reproduction of the input signal 13 is developed at the common point which is connected to the output terminal 131.

The foregoing recital of operation is correct for an ideal circuit; however, such ideal is not achieved because of the operation of the converter which results in a certain amount of slope in the rise and fall times of the voltage alternations at the electrodes 17, 18. It has been found that during the movement of the vibrating element 14 between contacts 17, 18 there occurs a period when both of the square wave amplifiers 26, 31 are simultaneously connected to input terminals 11, 12. Such action by the converter 16 results in an overlapping of the two square wave voltages 24, 25 and, unless corrected, causes a distortion in the reproduced and amplified output at the terminals 131, 132.

To correct for the above-referenced distortion the sine wave of the alternating current 23 at the terminals 21, 22 is utilized to form a square wave voltage 121 which is, in turn, utilized to control the periods of conduction of the first tube sections 42, 67 of the first and second tubes 41, 66. The phase-shifting network comprising potentiometer 96 and capacitor 97 is adjusted so that the voltage applied to the control grid 101 of the first section 87 of the third tube 86 commences at the instant when both of the square wave amplifiers 26, 31 are connected to the input terminals 11, 12 through the converter unit 16. Both the first and second sections 87, 88 of the third tube 86 are connected as overdriven amplifiers which results in a square wave output 121 at the anode 116 of the second section as applied to the control grid 83 of the second section 68 of the tube 66. During the positive-going alternation of the square wave 121 such second section 68 conducts to raise the cathode voltage of the first section 67 of the second tube 66 and simultaneously applies a negative-going alternation of the square wave 124 at the control grid 56 of the second section of the first tube 41. Thus, the second section 43 of the first tube 41 conducts by a minimum amount and remains in such condition for a time determined by the duration of the negative-going alternation of the square wave 124. From the foregoing it will be readily apparent that for the half cycle under consideration the first section 67 of the second tube 66 will not respond to the voltage applied to the control grid 72, whereas the first section 42 of the first tube 41 will respond to the voltage applied to the control grid 46. During the next half cycle, the square wave 121 impresses a negative-going alternation at the control grid 83 of the second section 68 of the second tube 66 and a positive-going alternation at the control grid 56 of the second section 43 of the first tube. Such voltages result in a cut-off condition of the first tube 41 because of the increased cathode voltage and a condition in the second tube 66 whereby the first section 67 thereof responds to voltage at the control grid 72. Thus, since both first sections of the first and second tubes 41, 66 have a common anode connection and dropping resistor 48, the voltage 133 at the output terminals 131, 132 is an amplified reproduction of the input voltage 13.

With the arrangement of elements and the operation thereof as set forth, the periods of conduction of the first sections 42, 67 of the first and second tubes 41, 66 are alternately controlled so that both sections do not conduct at the same time. In such manner then distortion introduced by the converter unit 16 is substantially eliminated in the output at the terminals 131, 132.

While the salient features of the present invention have been described in detail with respect to one embodiment, it will be apparent that numerous modifications may be made within the spirit and scope of the invention, and it is therefore not desired to limit the invention to the exact details shown except insofar as they may be defined in the following claim.

What is claimed is:

In an amplifier of a signal having a direct current component with a susperimposed alternating component, the combination comprising a first and a second square wave amplifier each having an input and an output; terminal means for connection to a signal having a direct current component with a superimposed alternating component; a converter unit having a first fixed electrode connected to the input of said first square wave amplifier, a second fixed electrode connected to the input of said second square wave amplifier, and a vibrating electrode oscillating between said fixed electrodes at a selected frequency connected to said terminal means; a first and a second amplifier tube each having at least a control grid, cathode, and anode; first coupling means connected between the output of said first square wave amplifier and the control grid of said first tube; second coupling means connected between the output of said second square wave amplifier and the control grid of said second tube; a single first dropping resistor connected to the anode of each of said first and second tubes and to a positive terminal of a source of operating potential; a first cathode resistor connected between the cathode of said first tube and a grounded connection of said source of operating potential; a second cathode resistor connected between the cathode of said second tube and said grounded connection; a third and a fourth amplifier tube each having a control grid, cathode, and anode; a first direct connection extended between the cathode of said third tube and the cathode of said first tube; a second direct connection extended between the cathode of said fourth tube and the cathode of said second tube; a third direct connection extended from the anode of said third tube to said positive terminal; coupling means connected between the anode of said fourth tube and the control grid of said third tube and a second dropping resistor connected between the anode of said fourth tube and said positive terminal; a square wave generator synchronized at the frequency of said vibrating electrode coupled to the control grid of said fourth tube and including phasing means to impress positive-going alternations during the time said vibrating electrode contacts said second fixed electrode; whereby an amplified reproduction of said signal is produced at the anode of said second tube.

References Cited in the file of this patent

UNITED STATES PATENTS

| | | |
|---|---|---|
| 2,226,459 | Bingley | Dec. 24, 1940 |
| 2,252,612 | Bingley | Aug. 12, 1941 |
| 2,459,730 | Williams | Jan. 18, 1949 |
| 2,678,997 | Darlington | May 18, 1954 |
| 2,706,265 | Buehler | Apr. 12, 1955 |